(12) United States Patent
Kim

(10) Patent No.: US 6,408,501 B1
(45) Date of Patent: Jun. 25, 2002

(54) AUTOMATIC SYSTEM OF MANUFACTURING BALL STUDS FOR VEHICLES

(75) Inventor: Sung Hwan Kim, Kyoungsangnamdo (KR)

(73) Assignee: Central Corporation, Kyoungsangnamdo (KR)

( * ) Notice: Subject to any disclaimer, the term of this patent is extended or adjusted under 35 U.S.C. 154(b) by 0 days.

(21) Appl. No.: 09/709,385

(22) Filed: Nov. 13, 2000

Related U.S. Application Data

(63) Continuation-in-part of application No. 09/210,722, filed on Dec. 14, 1998, now abandoned.

(30) Foreign Application Priority Data

Jul. 30, 1998 (KR) ............................................ 98-30949

(51) Int. Cl.$^7$ .............................................. B23Q 17/00
(52) U.S. Cl. .............................. 29/407.01; 29/898.043; 29/898.052; 72/68; 72/226; 72/356; 72/4; 700/96; 700/182
(58) Field of Search ..................... 29/898.043, 898.052, 29/407.01; 72/206, 214, 226, 68, 356, 4; 700/96, 182

(56) References Cited

U.S. PATENT DOCUMENTS

| | | | |
|---|---|---|---|
| 3,036,367 A | 5/1962 | Ricks | |
| 3,187,543 A | 6/1965 | Roehrs | |
| 3,255,623 A | 6/1966 | Ricks | |
| 3,553,826 A | 1/1971 | Abe | |
| 3,644,973 A | 2/1972 | Abe | |
| 3,803,890 A | * 4/1974 | Connell | 72/107 |
| 3,885,996 A | 5/1975 | Abe | |
| 4,327,568 A | 5/1982 | Berstein | |
| 4,472,783 A | 9/1984 | Johnstone et al. | |
| 4,543,812 A | * 10/1985 | Theobald | 72/355.4 |
| 4,564,913 A | 1/1986 | Yomogida et al. | |
| 4,698,766 A | 10/1987 | Entwistle et al. | |
| 4,827,423 A | 5/1989 | Beasley et al. | |

(List continued on next page.)

FOREIGN PATENT DOCUMENTS

| | | |
|---|---|---|
| DE | 4131692 A1 | 3/1993 |
| DE | 19513168 A1 | 10/1996 |
| EP | 194594 A2 | 9/1986 |
| EP | 346816 | 12/1989 |
| JP | 141681 | 6/1996 |
| JP | 141682 | 6/1996 |

*Primary Examiner*—S. Thomas Hughes
*Assistant Examiner*—Essama Omgba
(74) *Attorney, Agent, or Firm*—McDermott, Will & Emery

(57) ABSTRACT

An automatic system of manufacturing ball studs for vehicles which establishes various processes inline to diagnose each process and perform production and inventory control. The system comprises a cold forging unit for uncoiling and forming a cold coil for ball studs into ball studs shaped at least 50% similar to a desired one; first cleaning unit for removing burrs or lubricant layers of materials from the cold forged ball studs; an impurity inspection unit for determining whether the burrs or lubricant layers are properly removed; a unit for rolling a head, a neck and threads with a rolling machine; second cleaning unit for completely removing impurities from the ball studs; an inspection unit for finding dimensional defects and minute breaks or cracks from the ball studs after the second cleaning; a storage unit for storing the ball studs into a warehouse by an automated transport robot after the inspection; a central control unit for controlling the units to be operated in sequence, performing an emergency stop of the units in response to a defect signal from the inspection unit, and diagnosing abnormal conditions of the units; and an FMS server for storing product data related to the abnormal and operated conditions and amount of production into a database and transmitting the same in the case of necessity.

4 Claims, 3 Drawing Sheets

U.S. PATENT DOCUMENTS

| | | |
|---|---|---|
| 5,124,588 A | 6/1992 | Kaneko et al. |
| 5,231,585 A | 7/1993 | Kobayashi et al. |
| 5,469,361 A | 11/1995 | Moyne |
| 5,689,882 A | 11/1997 | Adachi et al. |
| 5,691,895 A | 11/1997 | Kurtzburg et al. |
| 5,742,511 A | 4/1998 | Chasse et al. |
| 6,038,486 A | 3/2000 | Saitoh et al. |
| 6,044,685 A * | 4/2000 | Delgado et al. ............... 72/356 |
| 6,240,765 B1 * | 6/2001 | Delgado et al. ............... 72/356 |

* cited by examiner

AUTOMATIC SYSTEM OF MANUFACTURING BALL STUDS FOR VEHICLES

RELATED APPLICATIONS

This application claims the priority of U.S. patent application Ser. No. 09/210,722, filed Dec. 14, 1998 now abandoned, of which this application is a Continuation-In-Part, which claims the benefit of the priority under 35 U.S.C. 119 of Korean Patent Application No. 98-30949, filed Jul. 30, 1998.

BACKGROUND OF THE INVENTION

1. Field of the Invention

The invention relates to an automatic system of manufacturing ball studs for vehicles, in particular to an automatic system which can diagnose each process and perform production and inventory control through establishing various processes inline to automatically manufacture ball studs for vehicles.

2. Description of the Related Art

In general, a ball stud is cold forged or machine worked after a steel rod is cut into pieces of a desired size for ball studs as shown in FIG. 1. Here, the cold forged piece is formed of a head, threads, a tapered part and a neck for a ball stud. The cold forged steel piece is strengthened through heat treatment, quenching, and annealing or tempering. The threads of the cold forged piece is formed of a pin hole through a pin hole machining to prevent unscrewing and separating of a nut. Then, the process is carried out in the sequence of machine-cutting the head, burnishing the tapered part, the neck and the head, and thread-rolling the threads.

Techniques of the prior art, even though automated, can not depart from a lot production method and thus productivity enhancement can not be expected. Namely, spheroidized material of cold forging is put into a barret, cleaned, and heat treated through annealing, tempering and etc. A pin hole is machined, and then a head and a neck are machined to form a shape similar to a finished article. After machining, the head is burnished to obtain a desired surface illuminance. Then, a nut which is subjected to the final fabrication is machined. The machining method undergoes rolling process.

The cold forged piece in (a) of FIG. 1 is automatically produced by using a part former. The produced piece is cleaned to eliminate minute burrs and surface treated parts. In (b) and (c) of FIG. 1, heat treatment is performed to enhance strength and toughness of the structural steel material. Here, the heat treatment satisfies strength, hardness and toughness regulated in KS, i.e., Korean (Industrial) Standards. A pin hole is machined in (d) of FIG. 1. In (e) of FIG. 1, the piece is cut by using NC machine to obtain substantially same size as the finished article. (f) of FIG. 1 shows burnishing, in which ball joint should satisfy high illuminance regulation since it is a key part of carrying out continuous relative motion. Then, rolling of the threads is performed to finish the process for manufacturing a ball stud.

The process like this, however, has a lot production method which obstructs productivity enhancement, and as an article is machined, additional production cost is required for material, fabrication and other processes, and it is difficult to reduce production period. Also, as the cold forged article is cut, strength of the article degrades and thus property of the article may deteriorate.

In particular, various proposals about the head and neck rolling of ball studs for ball joints have been presented, one of which is disclosed in Japanese Open Patent Application Publication No. Sho 61-38730. In this document, a jig is correspondingly machined toward a neck, and a head is machined in various processes to realize a desired illuminance, so that production period is increased to degrade productivity. Also, cold forging is accompanied by cutting and thus excellent article properties may not be obtained.

SUMMARY OF THE INVENTION

The invention is proposed to solve the foregoing problems, which has an object to provide an automatic system of manufacturing ball studs for vehicles in which various processes from cold forging through manufacturing finished articles to warehouse storage can be established inline so that productivity can be adjusted freely, each of the processes can be monitor-controlled for anchored diagnosis and thus system control, production control an inventory control can be performed.

According to the object of the present invention, there is provided an apparatus of automatically manufacturing ball studs comprising: a cold forging unit for uncoiling and forming a cold coil for ball studs into ball studs shaped at least 50% similar to a desired one; first cleaning unit for removing burrs or lubricant layers of materials from the cold forged ball studs; an impurity inspection unit for determining whether the burrs or lubricant layers are properly removed; a unit for rolling a head, a neck and threads with a rolling machine; second cleaning unit for completely removing impurities from the ball studs; an inspection unit for finding dimensional defects and minute breaks or cracks from the ball studs after the second cleaning; a storage unit for storing the ball studs into a warehouse by an automated transport robot after the inspection; a central control unit for controlling the units to be operated in sequence, performing an emergency stop of the units in response to a defect signal from the inspection unit, and diagnosing abnormal conditions of the units; and an FMS server for storing product data related to the abnormal and operated conditions and amount of production into a database and transmitting the same in the case of necessity.

Here, it is preferred that the inspection unit generates different signals according to defected parts of the head, the neck and the threads, respectively; and the central control unit receives the signals to determine which unit is malfunctioning and performs an emergency stop of the unit.

According to the object of the invention, there is also provided a method of automatically manufacturing ball studs comprising the steps of: cold forging to uncoil and form a cold coil for ball studs into ball studs shaped at least 50% similar to a desired one; first cleaning to remove burrs or lubricant layers of materials from the cold forged ball studs; impurity inspecting to determine whether the burrs or lubricant layers are properly removed; rolling a head, a neck and threads with a rolling machine; second cleaning to completely remove impurities from the ball studs; inspecting dimensional defects and minute breaks or cracks from the ball studs after the second cleaning step; storing the ball studs into a warehouse by an automated transport robot after the inspecting step; central controlling the steps to be operated in sequence, performing an emergency stop of the steps in response to a defect signal from the inspecting step, and diagnosing abnormal conditions of the steps; and storing product data related to the abnormal and operated conditions and amount of production into a database and transmitting the same in the case of necessity.

Here, it is preferred that the inspecting step generated different signals in according to defected parts of the head, the neck and the threads, respectively; and the central controlling step receives the signals to determine which unit is malfunctioning and performs an emergency stop of the unit.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

Figure 1:
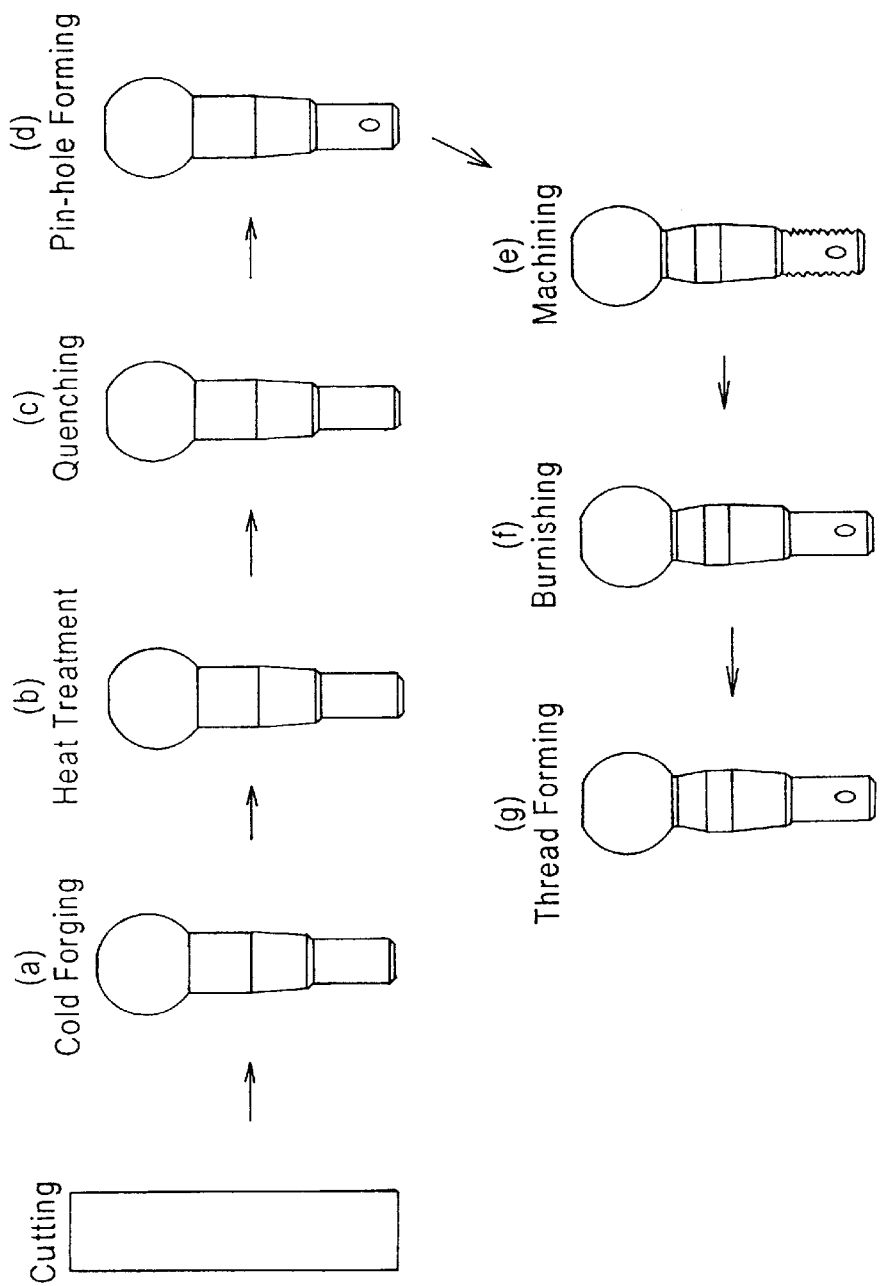
FIG. 1 is a process drawing for illustrating manufacturing process of ball studs according to prior art.
Figure 2:
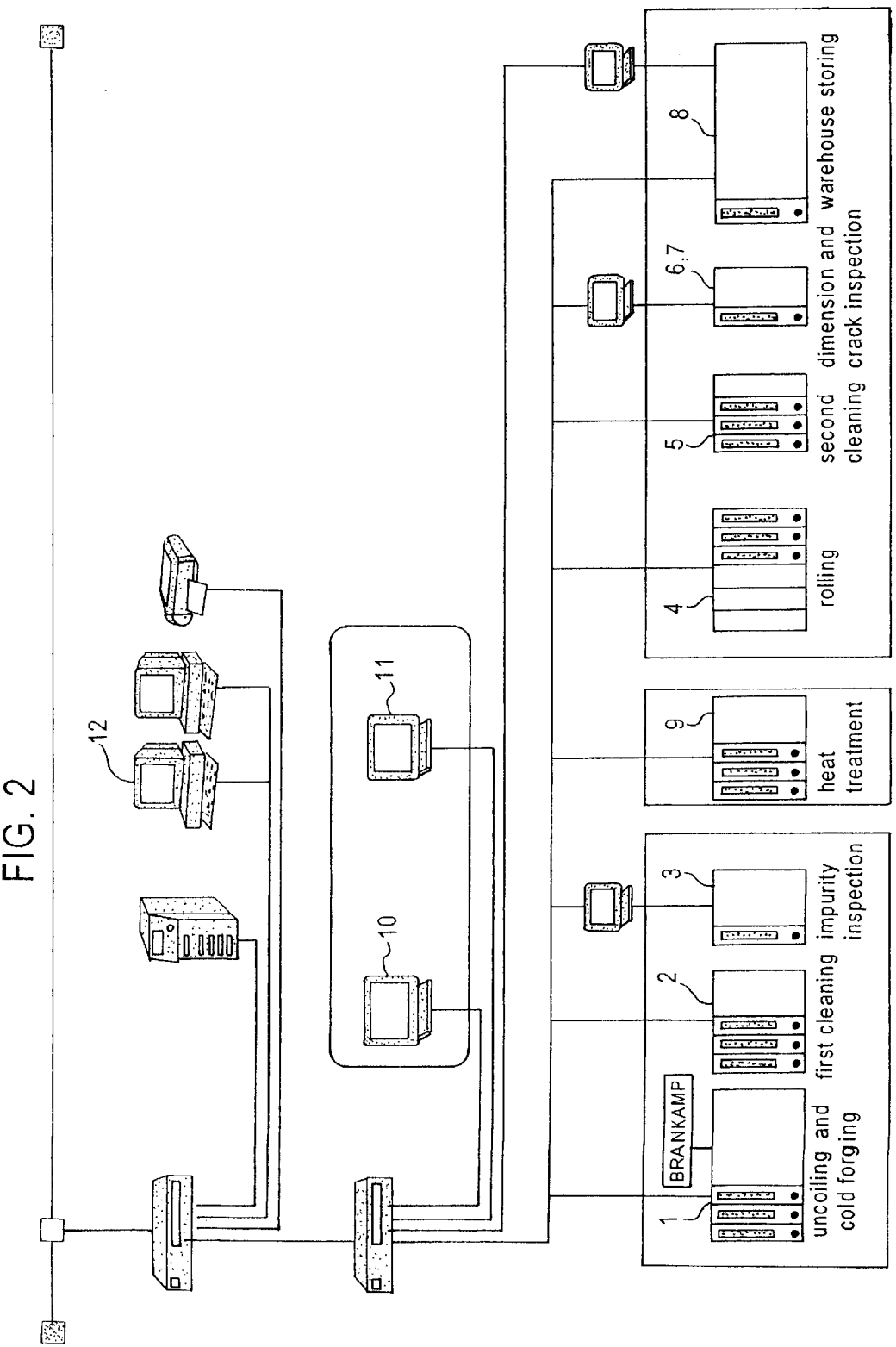
FIG. 2 is a block diagram for illustrating an automatic system for manufacturing ball studs for vehicles according to the invention.

Hereinafter, an automatic system for manufacturing ball studs for vehicles according to the invention will be described in detail in reference to the accompanying drawings.

The automatic system comprises the processes of uncoiling and cold forging, first cleaning, impurity inspecting, rolling, burnishing, second cleaning, dimension inspecting, crack inspecting and warehouse storing, in which an FMS (Flexible Manufacture System) is established inline for automatically perform the foregoing processes. A CIM (Computer Integrated Manufacture) algorithm is installed to the FMS to control/manage the foregoing processes in sequence/succession and perform production rate control, quality inspection and inventory control.

The FMS is established inline with processes or units: of cold forging 1 to uncoil and form a cold coil for ball studs into ball studs shaped at least 50% similar to a desired one; first cleaning 2 to remove burrs or lubricant layers of materials from the cold forged ball studs; impurity inspecting 3 to determine whether the burrs or lubricant layers are properly removed; rolling a head, a neck and threads 4 with a rolling machine so that the ball stud of 50% shape can be finished into complete ball studs after the impurity inspection; second cleaning 5 to completely clean the finished ball studs; dimension inspecting 6 to find dimensional defects which can be created by the forging and the rolling after the second cleaning; crack inspecting 7 to find minute breaks or cracks on the ball studs inspected and approved by the dimension inspection; warehouse storing 8 to store the ball studs approved by the final crack inspection by an automated transport robot. Here, the dimension inspecting process 6 can find which unit malfunctions according to defected parts such as in head, neck or threads. Between the impurity inspecting process and the rolling process may be added a process or unit 9 of heat treating the ball studs to enhance strength. The heat treating process 9 can be included or omitted to/from the overall processes by selective decision of heat treatment or cold treatment when process instructions are initially input. Here, each of the processes is carried out by corresponding unit to perform a corresponding operation.

Also, the FMS is adapted to connect the foregoing various processes inline and monitor each of the processes. When one of the monitored processes is found with defects lacking standard or quantity exceeding a predetermined value, a signal is transmitted to stop the all previous processes and examine defects. The following processes are carried out for a predetermined time and then stopped. Operation and breakdown conditions of each process are stored in a database in a certain period of time. In this manner, each unit of each process is controlled by a central control unit 10 which is established inline. The central control unit 10 is operated according to the CIM algorithm which is shared with an FMS server 12 to diagnose and monitor the overall processes through understanding operated conditions from breakdown conditions. The database is installed in the FMS server 12 and can store all data treated by the central control unit 10, namely, process instructions input by an operator, operated conditions, breakdown conditions, produced quantity, producing time and etc. in time range or by subject. Here, a subsidiary central control unit 11 is provided to cooperate with the central control unit 10 to perform the functions thereof subsidiarily in the event of malfunctioning or breaking down of the central control unit 10.

Between the processes, the central control unit 10 and the FMS server 12, a communication is established such as TCP/IP including LAN or internet for transmitting data. In particular, the FMS server 12 is externally connected via the communication to read data in each of sales branch, a technology laboratory, management departments, production departments, quality departments, purchasing department and etc., thereby allowing maximization of cooperative operational efficiency and the overall automation.

Figure 3:
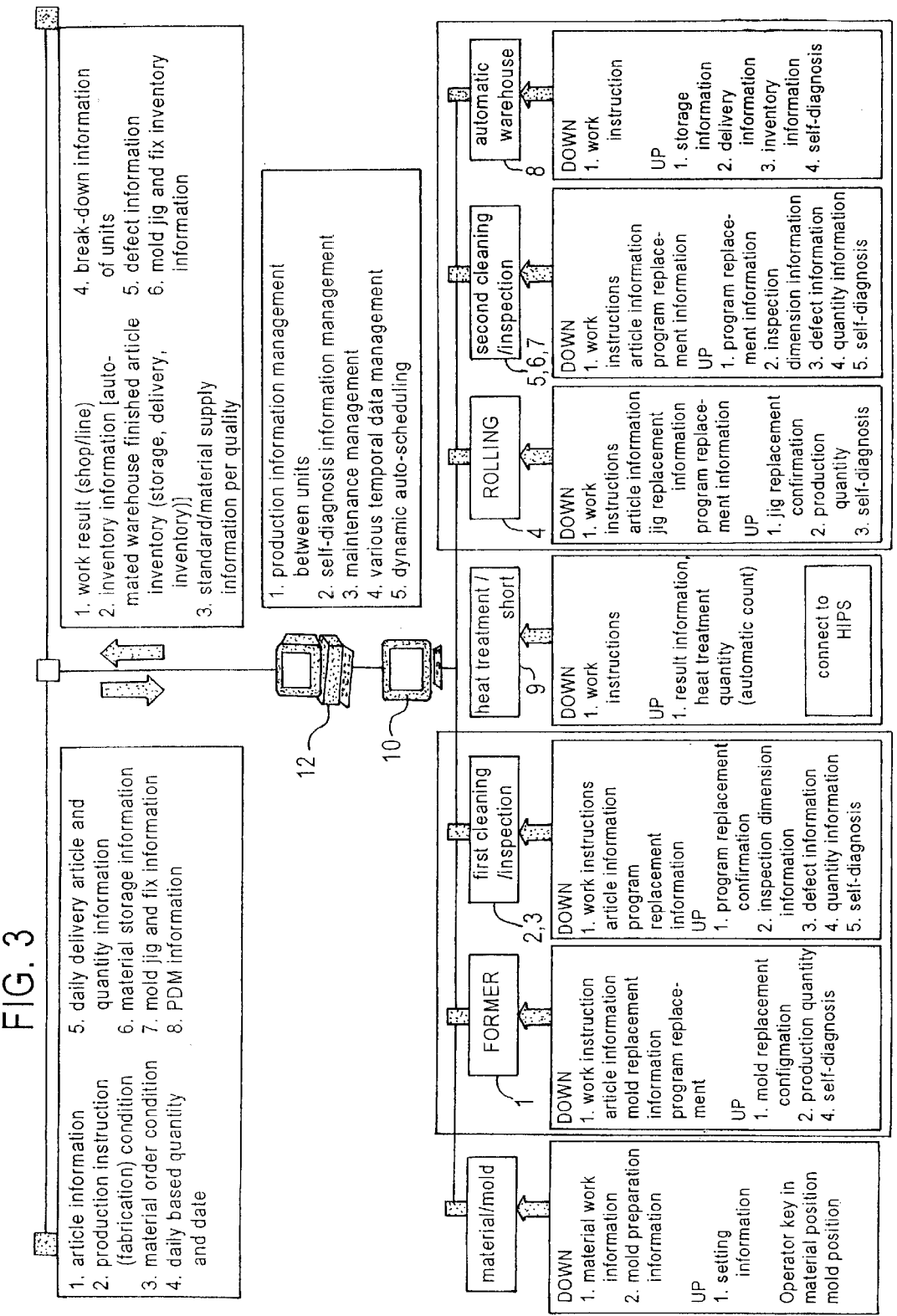
FIG. 3 is a flow chart for illustrating network data movement in the automatic system for manufacturing ball studs for vehicles according to the invention.

The foregoing automatic system operates according to a flow chart as shown in FIG. 3. When the external production management department inputs at least one of dimension information and production quantity of ball studs, material order information, daily based production quantity, daily delivery article, material storage information, and mold jig and fix information to the automatic system, the FMS server 12 transmits information corresponding to the input information to the production management department. The transmitted information is from production information management between units, self-diagnosis information management, maintenance management, various temporal data management and dynamic auto-scheduling.

The information stored in the FMS server 12 is adapted to be shared with the central control unit 10 which provides operation instructions, article information, mold replacement information and program replacement information and receives mold replacement confirmation and self-diagnosis data to/from the uncoiling and cold forging unit 1. Also, the central control unit 10 provides operation instructions, article information and program replacement information and receives program replacement confirmation, inspected dimension information, defect information, quantity information and self-diagnosis data to/from the cleaning and inspecting unit 2 and 3. The central control unit 10 also provides operation instructions, article information, jig replacement information and program replacement information and receives jig replacement confirmation, produced quantity and self-diagnosis data to/from the rolling unit 4. Furthermore, the central control unit 10 provides operation instructions, article information and program replacement information and receives program replacement information, inspected dimension information, defect information, quantity information and self-diagnosis data to/from the cleaning unit 5 and the dimension and crack inspecting units 6 and 7.

The warehouse storing unit 8 is provided with operation instructions and provides storage information, delivery information and self-diagnosis data to the central control unit 10.

When the central control unit 10 receives data from the foregoing number of units, the FMS server 12 provides a number of data to the production management department via the CIM algorithm. In other words, work result, inventory information, standard, break-down information of units, defect information of ball studs and mold jig and fix inventory information are provided.

According to the invention, various processes from cold forging through manufacturing of finished articles to warehouse storage can be established inline so that productivity can be adjusted freely. Due to the foregoing system, production and inventory management, the unit cost of production can be reduced and unmanned automation can be realized to maximize productivity. Also, production rate can be suitably adjusted according to order conditions to avoid undesired waste of material and demand and supply can be properly handled.

What is claimed is:

1. An apparatus of automatically manufacturing ball studs comprising:

a cold forging unit for uncoiling and forming a cold coil for ball studs into ball studs shaped at least 50% similar to a desired one;

a first cleaning unit for removing burrs or lubricant layers of materials from said cold forged ball studs;

an impurity inspection unit for determining whether the burrs or lubricant layers are properly removed;

a unit for rolling a head, a neck and threads with a rolling machine;

a second cleaning unit for completely removing impurities from the ball studs;

an inspection unit for finding dimensional defects and minute breaks or cracks from said ball studs after the second cleaning;

a storage unit for storing said ball studs into a warehouse by an automated transport robot after the inspection;

a central control unit for controlling said units to be operated in sequence, performing an emergency stop of said units in response to a defect signal from said inspection unit, and diagnosing abnormal conditions of said units; and an FMS server for storing product data related to said abnormal and operated conditions and amount of production into a database and transmitting the same in the case of necessity.

2. The apparatus of automatically manufacturing ball studs according to claim 1, wherein said inspection unit generates different signals according to defected parts of the head, the neck and the threads, respectively; and wherein said central control unit receives the signals to determine which unit is malfunctioning and performs an emergency stop of the malfunctioning unit.

3. The method of automatically manufacturing ball studs according to claim 1, wherein said inspecting step generates different signals according to defected parts of the head, the neck and the threads, respectively; and wherein said central controlling step receives the signals to determine which unit is malfunctioning and performs an emergency stop of the malfunctioning unit.

4. A method of automatically manufacturing ball studs comprising the steps of:

cold forging to uncoil and form a cold coil for ball studs into ball studs shaped at least 50% similar to a desired one;

first cleaning to remove burrs or lubricant layers of materials from the cold forged ball studs;

a first inspecting step comprising impurity inspecting to determine whether the burrs or lubricant layers are properly removed;

rolling a head, a neck and threads with a rolling machine;

second cleaning to completely remove impurities from the ball studs;

a second inspecting step comprising inspecting dimensional defects and minute breaks or cracks from the ball studs after said second cleaning step;

storing said ball studs into a warehouse by an automated transport robot after said second inspecting step;

central controlling said steps to be operated in sequence, performing an emergency stop of said steps in response to a defect signal from said inspecting step, and diagnosing abnormal conditions of said steps; and storing product data related to the abnormal and operated conditions and amount of production into a database and transmitting the same in the case of necessity.

\* \* \* \* \*